United States Patent
Watanabe

(10) Patent No.: US 10,663,625 B2
(45) Date of Patent: May 26, 2020

(54) SPECTACLE LENS

(71) Applicant: HOYA LENS THAILAND LTD., Patumthani (TH)

(72) Inventor: Makoto Watanabe, Shinjuku-ku (JP)

(73) Assignee: HOYA LENS THAILAND LTD., Patumthani (TH)

( * ) Notice: Subject to any disclaimer, the term of this patent is extended or adjusted under 35 U.S.C. 154(b) by 51 days.

(21) Appl. No.: 15/306,459

(22) PCT Filed: Apr. 24, 2015

(86) PCT No.: PCT/JP2015/062600
§ 371 (c)(1),
(2) Date: Jan. 5, 2017

(87) PCT Pub. No.: WO2015/163467
PCT Pub. Date: Oct. 29, 2015

(65) Prior Publication Data
US 2017/0131438 A1 May 11, 2017

(30) Foreign Application Priority Data
Apr. 24, 2014 (JP) .................................. 2014-090741

(51) Int. Cl.
*G02B 1/14* (2015.01)
*G02B 1/04* (2006.01)
(Continued)

(52) U.S. Cl.
CPC .................. *G02B 1/14* (2015.01); *B32B 7/02* (2013.01); *B32B 27/20* (2013.01); *G02B 1/041* (2013.01);
(Continued)

(58) Field of Classification Search
CPC ...... G02C 7/02; G02C 7/022; G02C 2202/16; G02B 1/04; G02B 1/041; G02B 1/14; B32B 27/18; B32B 27/20; G32B 7/02
See application file for complete search history.

(56) References Cited

U.S. PATENT DOCUMENTS 5,955,206 A * 9/1999 Okazaki ............. C08G 18/3876
428/542.8
6,070,979 A * 6/2000 Kagei .................... G02B 1/105
351/159.57
(Continued)

FOREIGN PATENT DOCUMENTS

| CN | 1749782 | 3/2006 |
| EP | 1548468 | 6/2005 |

(Continued)

OTHER PUBLICATIONS

International Search Report and Written Opinion dated Jul. 7, 2015 for application PCT/JP2015/062600, filed on Apr. 24, 2015 and published as WO 2015/0163467 on Oct. 29, 2015 (Applicant—Hoya Lens Thailand Ltd. // Inventor—Wanatabe (9 pages).

(Continued)

*Primary Examiner* — William R Alexander
*Assistant Examiner* — Ephrem Z Mebrahtu
(74) *Attorney, Agent, or Firm* — Kilpatrick Townsend & Stockton LLP

(57) ABSTRACT

A spectacle lens exhibiting excellent weather resistance and a method for manufacturing the same. In the spectacle lens and the method for manufacturing the same, the spectacle lens includes a lens substrate having a refractive index of from 1.58 to 1.74 and a hard coat layer that is obtained by curing a mixture containing silica particles and a silane compound and has a refractive index of from 1.49 to 1.51.

19 Claims, 1 Drawing Sheet

(51) Int. Cl.
  *G02C 7/02* (2006.01)
  *B32B 27/20* (2006.01)
  *B32B 7/02* (2019.01)
(52) U.S. Cl.
  CPC .............. *G02C 7/02* (2013.01); *G02C 7/022* (2013.01); *G02C 2202/16* (2013.01)

(56) References Cited

U.S. PATENT DOCUMENTS

| | | | |
|---|---|---|---|
| 2004/0074261 | A1 | 4/2004 | Caron et al. |
| 2005/0244623 | A1* | 11/2005 | Nishida .................... G02B 1/10 428/212 |
| 2006/0056030 | A1 | 3/2006 | Fukuda et al. |
| 2010/0110521 | A1 | 5/2010 | Kawaguchi et al. |
| 2011/0085127 | A1* | 4/2011 | Wada .................... G02C 7/027 351/45 |
| 2011/0257298 | A1* | 10/2011 | Ishihara ................ B82Y 30/00 523/442 |
| 2013/0293824 | A1* | 11/2013 | Yoneyama ............... B32B 7/12 349/194 |
| 2015/0024212 | A1* | 1/2015 | Uchida .................... C09D 1/00 428/413 |
| 2015/0331147 | A1* | 11/2015 | Ryu ..................... C08G 18/758 351/159.57 |

FOREIGN PATENT DOCUMENTS

| | | |
|---|---|---|
| JP | S62-011801 | 1/1987 |
| JP | H08-34897 A | 2/1996 |
| JP | H10-282301 A | 10/1998 |
| JP | H11-92653 A | 4/1999 |
| JP | H11-92655 A | 4/1999 |
| JP | 2004013127 | 1/2004 |
| JP | 3588375 B2 | 11/2004 |
| JP | 2004345333 | 12/2004 |
| JP | 2005-513569 A | 5/2005 |
| JP | 2005178173 | 7/2005 |
| JP | 2006-171163 A | 6/2006 |
| JP | 2008242425 | 10/2008 |
| JP | 2009-197078 A | 9/2009 |
| JP | 2009197078 A * | 9/2009 |
| JP | 2014-048479 A | 3/2014 |
| WO | WO-2004/031814 A1 | 4/2004 |
| WO | WO-2008/105306 A1 | 9/2008 |

OTHER PUBLICATIONS

Supplementary European Search Report dated Aug. 3, 2017 by the European Patent Office for EP Application No. 15782797, which was filed on Apr. 24, 2015 and published as EP 3136136 A1 on Mar. 1, 2017 (Applicant—Hoya Lens Thailand Ltd.) (8 pages).

Office Action dated Jul. 26, 2017 by the SIPO for CN Application No. 201580021466, which was filed on Apr. 24, 2015 and published as CN 106233163A on Dec. 14, 2016 (Applicant—Hoya Lens Thailand Ltd.) (Original—5 pages//Translated—8 pages).

* cited by examiner

SPECTACLE LENS

CROSS-REFERENCE TO RELATED APPLICATIONS

This application is a U.S. National Phase Application of International Application No. PCT/JP2015/062600, filed Apr. 24, 2015, which claims priority to Japanese Patent Application No. 2014-090741, filed Apr. 24, 2014. The contents of these earlier filed applications are hereby incorporated by reference herein in their entirety.

TECHNICAL FIELD

The present disclosure relates to a spectacle lens having a hard coat layer.

BACKGROUND ART

There are various kinds of base materials for the plastic lens substrate. The material can be selected depending on the application or use environment of the user. For example, a great number of plastic lenses using a high refractive index substrate having a refractive index of 1.67 or more have been developed. Such a plastic lens using a high refractive index substrate is particularly useful, for example, for patients who require a lens having a high power of ±6.00 or more since the lens can be thinned, and thus it is in high demand.

In addition, a plastic lens substrate formed of a polycarbonate material (refractive index: 1.59) or a polyurethane material (refractive index: 1.53) is known as a highly impact-resistant lens since it exhibits excellent toughness.

On the other hand, plastic lenses generally have a low surface hardness, which is a drawback in abrasion resistance. Hence, it has hitherto been carried out to provide a hard coat layer on the plastic lens surface in order to compensate for this weakness.

However, interference fringes are caused in some cases in the case of forming a film such as a hard coat layer on the lens surface. This is because light is reflected at the interface between the lens substrate and the film due to the difference in refractive index between the lens substrate and the film and this light causes interference. The interference is likely to remarkably occur particularly in the case of a plastic lens having a high refractive index since the difference in refractive index between the lens substrate and the hard coat layer is greater in that case.

In Patent Literature 1, an optical product, such as a lens for spectacle, includes an organic or mineral glass substrate and at least one transparent high molecular substance layer. The interference fringe phenomenon occurring at the interface between the substrate and the high molecular substance layer is significantly suppressed with regard to the difference in refractive index between the substrate and the high molecular substance layer by an undercoat layer or abrasion-resistant coating layer. In the literature, an optical product is disclosed which includes at least one intermediate layer in direct contact with one main surface of the substrate and a high molecular substance layer and in which the intermediate layer has particles of at least one colloidal mineral oxide and optionally a binder. The intermediate layer has an initial void. The initial void of the intermediate layer is filled with a substance from the polymeric material layer or a substance of the substrate in a case in which the substrate is organic glass. The initial void may be partially filled with the binder in a case in which the binder is present. The intermediate layer becomes a quarter-wave plate at the wavelength in a range of from 400 to 700 nm and preferably from 450 to 650 nm, respectively, after the initial void is filled.

CITATION LIST

Patent Literature

Patent Literature 1: JP 2005-513569 A

SUMMARY

Technical Problem

The hard coat layer of the prior art has a problem in weather resistance.

Accordingly, an aspect of the present disclosure is to provide a spectacle lens exhibiting excellent weather resistance and a method for manufacturing the same.

Solution to Problem

The present disclosure relates to the following [1] to [9].

[1] A spectacle lens including a lens substrate having a refractive index of from 1.58 to 1.74 and a hard coat layer that is obtained by curing a mixture containing silica particles and a silane compound and has a refractive index of from 1.49 to 1.51.

[2] The spectacle lens according to [1], in which a content of an inorganic oxide containing an element belonging to from the group 3 to the group 13 in the periodic table in the hard coat layer is 0.1% by mass or less.

[3] The spectacle lens according to [1] or [2], further including a ground layer that is provided between the lens substrate and the hard coat layer, contains a resin having metal oxide particles dispersed, and has an optical film thickness of from $0.2\lambda$ to $0.3\lambda$ in light having a wavelength $\lambda$ of from 450 to 650 nm.

[4] The spectacle lens according to [3], in which a refractive index $\beta$ of the ground layer satisfies the following relational expression (1) with a refractive index $\alpha$ of the substrate and a refractive index $\gamma$ of the hard coat layer.

$$0.4 \leq (\alpha-\beta)/(\alpha-\gamma) \leq 0.6 \quad (1)$$

[5] The spectacle lens according to any one of [1] to [4], further including an intermediate layer containing a resin.

[6] The spectacle lens according to any one of [1] to [5], in which a film thickness of the hard coat layer is 8 μm or more and 100 μm or less.

[7] The spectacle lens according to any one of [1] to [6], in which a vibration amplitude of a ripple at a spectral reflectance of a measuring light wavelength of from 380 to 780 nm is set to 2% or less.

[8] A method for manufacturing a spectacle lens, the method includes (1) forming a ground layer having an optical film thickness of from $0.2\lambda$ to $0.3\lambda$ in light having a wavelength $\lambda$ of from 450 to 650 nm by coating a lens substrate having a refractive index of from 1.58 to 1.74 with a dispersion containing at least metal oxide particles and a resin and (2) forming a hard coat layer having a film thickness of 1 μm or more and 100 μm or less and a refractive index of from 1.49 to 1.51 by coating the lens substrate having the ground layer with a mixture containing silica particles and a binder and curing the mixture.

[9] The method for manufacturing a spectacle lens according to [8], in which the dispersion is applied by a spin coating method or a dipping method in (1).

Advantageous Effects

According to the present disclosure, it is possible to provide a spectacle lens exhibiting excellent weather resistance and a method for manufacturing the same.

DESCRIPTION OF EMBODIMENTS

Figure 1:
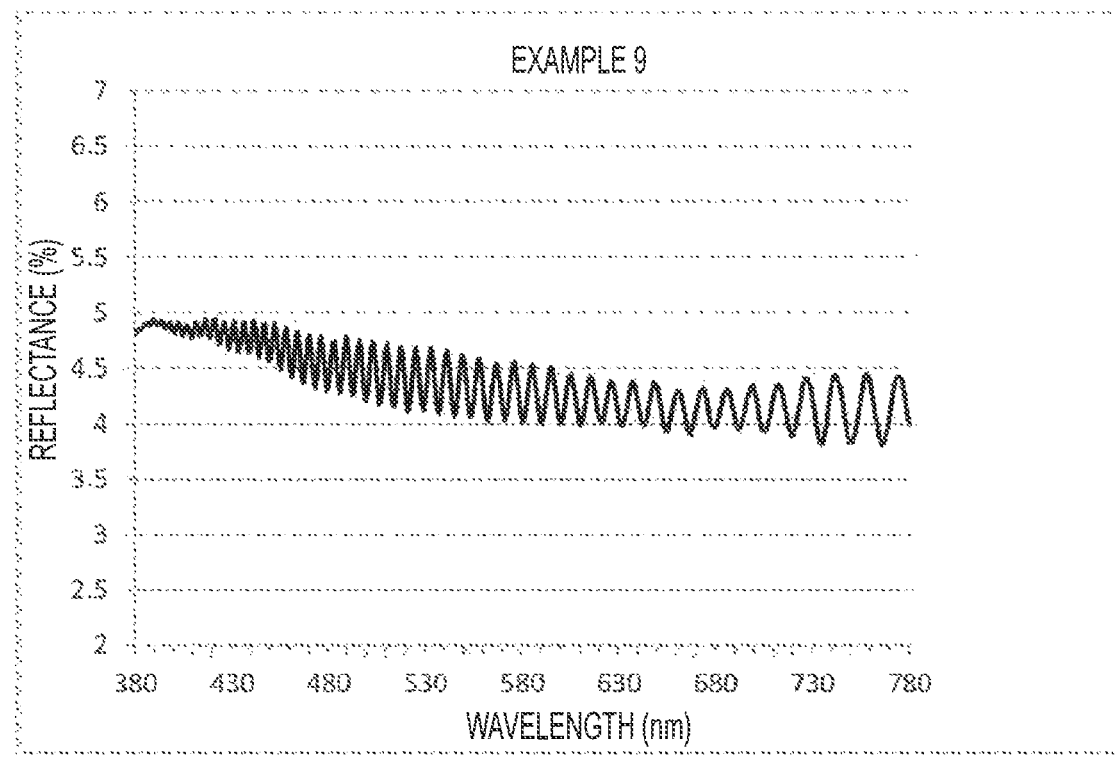
FIG. 1 illustrates the measurement results on the spectral reflectance of the lens of Example 9.

The spectacle lens of the present disclosure includes a lens substrate having a refractive index of from 1.58 to 1.74 and a hard coat layer that is obtained by curing a mixture containing silica particles and a silane compound and has a refractive index of from 1.49 to 1.51.

By using the hard coat layer that is obtained by curing a mixture containing silica particles and a silane compound and has the above refractive index, a spectacle lens exhibiting excellent weather resistance is obtained. The fact that the hard coat layer using silica particles and a silane compound has the above refractive index means that the hard coat layer is a hard coat layer which does not contain other metal oxides that have a high refractive index and are generally used as a refractive index adjusting material, and this makes it possible to obtain a spectacle lens exhibiting excellent weather resistance.

Hereinafter, the respective configurations of the embodiments will be described in detail.

(Lens Substrate)

The refractive index of the lens substrate used in the present disclosure is from 1.58 to 1.74.

With regard to the lens substrate, examples of the material to be used in the lens substrate of a spectacle lens may include plastics such as a polyurethane-based material (for example, polyurethane, polyurethane urea, polythiourethane), polycarbonate, and diethylene glycol-bis-allyl-carbonate and inorganic glass. The thickness and diameter of the lens substrate are not particularly limited. Usually, the thickness is about from 1 to 30 mm and the diameter is about from 50 to 100 mm. Colorless ones are usually used as the lens substrate, but it is also possible to use colored ones as long as the transparency is not impaired. In addition, the surface shape of the substrate on which a cured film is formed is not particularly limited, and it can be an arbitrary shape such as a flat shape, a convex shape, or a concave shape.

[Functional Layer]

In the spectacle lens of the present disclosure, the lens substrate is provided with at least a hard coat layer, and preferably it is further provided with a ground layer. Examples of other functional layers may include an intermediate layer (primer layer), a polarizing layer, and a photochromic layer. In addition, it is also possible to further provide functional layers such as an antireflection film, a water repellent film, an ultraviolet absorbing film, an infrared absorbing film, a photochromic film, and an antistatic film on the hard coat layer if necessary. With regard to functional layers other than these, known techniques related to spectacle lenses can be applied.

The spectacle lens of the present disclosure includes a lens substrate, a ground layer provided on the lens substrate, and a hard coat layer provided on the ground layer, and it may include a lens substrate, a ground layer provided on the lens substrate, an intermediate layer provided on the ground layer, and a hard coat layer provided on the intermediate layer. It may include a lens substrate, a ground layer provided on the lens substrate, an intermediate layer provided on the ground layer, and a hard coat layer provided on the intermediate layer.

The refractive index $\beta$ of the ground layer satisfies the following relational expression (1) with the refractive index $\alpha$ of the lens substrate and the refractive index $\gamma$ of the hard coat layer.

$$0.4 \leq (\alpha - \beta)/(\alpha - \gamma) \leq 0.6 \tag{1}$$

An interference fringe suppressing effect by the formation of the ground layer is remarkably obtained as the above expression is satisfied.

(Hard Coat Layer)

The film thickness of the hard coat layer is usually 1 μm or more and 100 μm or less. The film thickness is may be 3 μm or more and may be 5 μm or more from the viewpoint of enhancing the scratch resistance of the surface. It may be 8 μm or more or 10 μm or more, or 80 μm or less, or 60 μm or less, or 50 μm or less from the viewpoint of enhancing the scratch resistance, decreasing the vibration amplitude of the ripple, and remarkably obtaining an effect of suppressing the interference fringe.

The refractive index of the hard coat layer is from 1.49 to 1.51. In the hard coat layer obtained by curing a mixture containing silica particles and a silane compound, the refractive index in the above range, namely, means that a metal oxide for adjusting the refractive index is not substantially contained. This makes it possible to enhance the weather resistance of the spectacle lens.

In the hard coat layer, the content of the metal oxide containing an element belonging to from the group 3 to the group 13 in the periodic table may be 1% by mass or less, more preferably 0.5% by mass or less, and may be 0.1% by mass or less from the viewpoint of weather resistance.

The hard coat layer is obtained, for example, by curing a curable composition containing silica particles (hereinafter, referred to as the "component (A)"), a silane compound (hereinafter, referred to as the "component (B)"). The curable composition preferably contains the component (A), the component (B), and a polyfunctional epoxy compound (hereinafter, referred to as the "component (C)").

The component (A) is silica particles from the viewpoint of weather resistance. The particle size of the silica particles may be in a range of from 5 to 30 nm from the viewpoint of achieving both abrasion resistance and optical properties.

The component (B) is a silane compound, and it may be a silane compound having a hydrolyzable group and may be a silane coupling agent having an organic group to be bonded to a silicon atom and a hydrolyzable group.

Examples of the hydrolyzable group may include an alkoxy group, an aryloxy group, and a hydroxyl group, and the hydrolyzable group may be an alkoxy group.

The silane compound may be an organic silicon compound represented by the following general formula (I) or a hydrolysate thereof.

$$(R^1)_a(R^3)_b Si(OR^2)_{4-(a+b)} \tag{I}$$

In the general formula (I), a is 0 or 1 and b is 0 or 1, and in some embodiments a is 1 and b is 0 or 1.

$R^1$ represents an organic group having a functional group such as an epoxy group such as a glycidoxy group, a vinyl group, a methacryloxy group, an acryloxy group, a mercapto group, an amino group, or a phenyl group. In some embodiments $R^1$ represents an organic group having an epoxy group. The functional group may be directly bonded to a silicon atom or indirectly bonded thereto via a linking group such as an alkylene group.

$R^2$ represents, for example, a hydrogen atom, an alkyl group, an acyl group, or an aryl group. In some embodiments $R^2$ represents an alkyl group.

The alkyl group represented by $R^2$ is, for example, a straight-chain or branched alkyl group having from 1 to 4 carbon atoms, and specific examples thereof may include a methyl group, an ethyl group, a propyl group, and a butyl group, and preferably the alkyl group is a methyl group or an ethyl group.

The acyl group represented by $R^2$ is, for example, an acyl group having from 1 to 4 carbon atoms, and specific examples thereof may include an acetyl group, a propionyl group, an oleyl group, and a benzoyl group.

The aryl group represented by $R^2$ is, for example, an aryl group having from 6 to 10 carbon atoms, and specific examples thereof may include a phenyl group, a xylyl group, and a tolyl group.

$R^3$ can be an alkyl group or an aryl group.

The alkyl group represented by $R^3$ is, for example, a straight-chain or branched alkyl group having from 1 to 6 carbon atoms, and specific examples thereof may include a methyl group, an ethyl group, a propyl group, a butyl group, a pentyl group, and a hexyl group.

The aryl group represented by $R^3$ is, for example, an aryl group having from 6 to 10 carbon atoms, and specific examples thereof may include a phenyl group, a xylyl group, and a tolyl group.

Specific examples of the component (B) may include glycidoxymethyltrimethoxysilane, glycidoxymethyltriethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-lycidoxypropylvinyldimethoxysilane, γ-glycidoxypropylvinyldiethoxysilane, γ-glycidoxypropylphenyldimethoxysilane, γ-glycidoxypropylphenyldiethoxysilane, methyl silicate, ethyl silicate, n-propyl silicate, i-propyl silicate, n-butyl silicate, sec-butyl silicate, t-butyl silicate, tetraacetoxysilane, methyltrimethoxysilane, methyltriethoxysilane, methyltripropoxysilane, methyltriacetoxysilane, methyltributoxysilane, methyltripropoxysilane, methyltriamyloxysilane, methyltriphenoxysilane, methyltribenzyloxysilane, methyltriphenethyloxysilane, ethyltrimethoxysilane, ethyltriethoxysilane, vinyltrimethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl)-γ-aminopropyltrimethoxysilane, N-(β-aminoethyl)-γ-aminopropylmethyldimethoxysilane, γ-aminopropylmethyldimethoxysilane, N-(β-aminoethyl)-γ-aminopropyltriethoxysilane, N-(β-aminoethyl)-γ-aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptopropylmethyldiethoxysilane, methylvinyldimethoxysilane, and methylvinyldiethoxysilane.

Examples of the commercially available silane coupling agent may include the KBM-303, KBM-402, KBM-403, KBE402, KBE403, KBM-1403, KBM-502, KBM-503, KBE-502, KBE-503, KBM-5103, KBM-602, KBM-603, KBM-903, KBE-903, KBE-9103, KBM-573, KBM-575, KBM-9659, KBE-585, KBM-802, KBM-803, KBE-846, and KBE-9007 of trade names manufactured by Shin-Etsu Chemical Co., Ltd.

The component (C) is a polyfunctional epoxy compound containing two or more epoxy groups in one molecule. Some embodiments contain two or three epoxy groups in one molecule.

Specific examples of the component (C) may include aliphatic epoxy compounds such as 1,6-hexanediol diglycidyl ether, ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycol diglycidyl ether, tripropylene glycol diglycidyl ether, tetrapropylene glycol diglycidyl ether, nonapropylene glycol diglycidyl ether, neopentyl glycol diglycidyl ether, diglycidyl ether of neopentyl glycol hydroxypivalate, trimethylolpropane diglycidyl ether, trimethylolpropane triglycidyl ether, glycerol diglycidyl ether, glycerol triglycidyl ether, diglycerol diglycidyl ether, diglycerol triglycidyl ether, diglycerol tetraglycidyl ether, pentaerythritol diglycidyl ether, pentaerythritol triglycidyl ether, pentaerythritol tetraglycidyl ether, dipentaerythritol tetraglycidyl ether, sorbitol tetraglycidyl ether, diglycidyl ether of tris(2-hydroxyethyl) isocyanurate, and triglycidyl ether of tris(2-hydroxyethyl) isocyanurate, alicyclic epoxy compounds such as isophorone diol diglycidyl ether and bis-2,2-hydroxycyclohexylpropane diglycidyl ether, and aromatic epoxy compounds such as resorcinol diglycidyl ether, bisphenol A diglycidyl ether, bisphenol F diglycidyl ether, bisphenol S diglycidyl ether, orthophthalic acid diglycidyl ester, phenol novolac polyglycidyl ether, and cresol novolac polyglycidyl ether. As the component (C), a compound containing two or three epoxy groups (bifunctional or trifunctional epoxy compound) are used from the viewpoint of adhesive property with the adjacent layer or the lens substrate.

Examples of the commercially available polyfunctional epoxy compound may include the EX-201, EX-211, EX-212, EX-252, EX-313, EX-314, EX-321, EX-411, EX-421, EX-512, EX-521, EX-611, EX-612, EX-614, and EX-614B of "DENACOL" series of a trade name manufactured by Nagase ChemteX Corporation.

The curable composition can be prepared by mixing optional components such as an organic solvent, a surfactant (leveling agent), and a curing catalyst with the above components if necessary in addition to the components (A) to (C) described above.

The content of the component (A) may be 20% by mass or more, 30% by mass or more, or 40% by mass or more in the solid of the curable composition. The content of component (A) may be 80% by mass or less, 70% by mass or less, or 60% by mass or less in the solid of the curable composition.

The content of the component (B) may be 5% by mass or more, 10% by mass or more, or 15% by mass or more in the solid of the curable composition. Furthermore the content of component (B) may be 80% by mass or less, 70% by mass or less, or 60% by mass or less in the solid of the curable composition.

The content of the component (C) may be 0% by mass or more, 10% by mass or more, or 15% by mass or more in the solid of the curable composition. In some embodiments the content of component (C) is 50% by mass or less, 40% by mass or less, or 30% by mass or less in the solid of the curable composition.

The filler/matrix ratio (hereinafter, also simply referred to as the "F/M ratio") may be 0.5 or more, 0.6 or more, or 0.7 or more. In some embodiments the filler/matrix ratio may be 2.0 or less, 1.8 or less, or 1.5 or less.

Incidentally, the F/M ratio means the mass ratio [component (A)/(component (B)+component (C))] of the component (A) to the total mass of the component (B) and the component (C).

(Ground Layer)

The ground layer has an optical film thickness of from $0.2\lambda$ to $0.3\lambda$ in light having a wavelength $\lambda$ of from 450 to 650 nm in order to suppress the interference fringe. In the spectacle lens of the present disclosure, the ground layer functions as an interference fringe suppressing layer. In the spectacle lens, by providing the ground layer, it is possible to suppress the interference fringe without impairing the weather resistance even in a combination of the lens substrate having a refractive index of from 1.58 to 1.74 with the hard coat layer.

The ground layer is obtained, for example, by coating with a dispersion containing at least metal oxide particles and a resin.

The metal oxide particles are used from the viewpoint of adjusting the refractive index of the ground layer, and examples thereof may include particles of tungsten oxide ($WO_3$), zinc oxide ($ZnO$), silicon oxide ($SiO_2$), aluminum oxide ($Al_2O_3$), titanium oxide ($TiO_2$), zirconium oxide ($ZrO_2$), tin oxide ($SnO_2$), beryllium oxide ($BeO$), antimony oxide ($Sb_2O_5$), and the like, and metal oxide particles may be used singly or two or more kinds thereof may be concurrently used. In addition, it is also possible to use composite oxide particles of two or more kinds of metal oxides. The particle size of the metal oxide particles may be in a range of from 5 to 30 nm from the viewpoint optical properties.

Examples of the resin of the ground layer may include at least one kind selected from a polyurethane resin, an acrylic resin, or an epoxy resin, and in some embodiments the resin is a polyurethane resin and may be an aqueous resin composition containing a polyurethane resin, namely, an aqueous polyurethane resin composition. The aqueous polyurethane resin composition can be prepared by subjecting a high molecular weight polyol compound and an organic polyisocyanate compound to a urethanization reaction in a solvent that is inert to the reaction and exhibits great affinity for water together with a chain extender if necessary to obtain a prepolymer, neutralizing this prepolymer, and then dispersing the prepolymer in an aqueous solvent containing a chain extender to increase the molecular weight. For such an aqueous polyurethane resin composition and the preparation method thereof, it is possible to refer to, for example, paragraphs [0009] to [0013] in JP 3588375 B1, the paragraphs [0012] to [0021] in JP 8-34897 A, paragraphs [0010] to [0033] in JP 11-92653 A, and paragraphs [0010] to [0033] in JP 11-92655 A. In addition, as the aqueous polyurethane resin composition, it is also possible to use a commercially available waterborne urethane as it is or by diluting it with an aqueous solvent if necessary. As the commercially available waterborne polyurethane, for example, it is possible to use the "EVAFANOL" series manufactured by NICCA CHEMICAL CO., LTD., the "SUPERFLEX" series manufactured by DKS Co., Ltd., the "ADEKA BONTIGHTER" series manufactured by ADEKA CORPORATION, the "OLESTER" series manufactured by Mitsui Chemicals, Inc., the "VONDIC" series and "HYDRAN" series manufactured by DIC Corporation, the "IMPRANIL" series manufactured by Bayer AG, the "SOFLANATE" series manufactured by Nippon Soflan the "POIZ" series manufactured by Kao Corporation, the "SANPRENE" series manufactured by Sanyo Chemical Industries, Ltd., the "IZELAX" series manufactured by Hodogaya Chemical CO., LTD., and the "NEOREZ" series manufactured by Zeneca Group PLC.

The dispersion may contain an aqueous solvent. The aqueous solvent is, for example, water or a mixed solvent of water and a polar solvent or the like, and it may be water. The solid concentration in the aqueous resin composition may be from 1 to 60% by mass, and may be from 5 to 40% by mass from the viewpoint of liquid stability and film-forming property. The aqueous resin composition can also contain additives such as an antioxidant, a dispersant, and a plasticizer if necessary in addition to the resin component. In addition, a commercially available aqueous resin composition may be used by being diluted with a solvent such as water, an alcohol, or propylene glycol monomethyl ether (PGM).

(Intermediate Layer)

The intermediate layer is, for example, an aqueous resin layer formed from an aqueous resin composition containing a resin and an aqueous solvent. The intermediate layer functions as a so-called primer layer.

The refractive index of the intermediate layer may be from 1.49 to 1.51, and may be in a range of the refractive index of the hard coat layer±0.01.

The aqueous solvent contained in the aqueous resin composition is, for example, water or a mixed solvent of water and a polar solvent or the like, and it may be water. The solid concentration in the aqueous resin composition may be from 1 to 60% by mass and may be from 5 to 40% by mass from the viewpoint of liquid stability and film-forming property. The aqueous resin composition can also contain additives such as an antioxidant, a dispersant, and a plasticizer if necessary in addition to the resin component. In addition, a commercially available aqueous resin composition may be used by being diluted with a solvent such as water, an alcohol, or propylene glycol monomethyl ether (PGM).

The aqueous resin composition can contain resin component in a state of being dissolved in an aqueous solvent or a state of being dispersed as fine particles (preferably colloidal particles). Among them, the aqueous resin composition is desirably a dispersion in which the resin component is dispersed in an aqueous solvent (such as water) in the form of fine particles. In this case, the particle size of the resin component is preferably 0.3 μm or less from the viewpoint of dispersion stability of the composition. In addition, the pH of the aqueous resin composition may be about from 5.5 to 9.0 at 25° C. from the viewpoint of stability. The viscosity of the aqueous resin composition may be from 5 to 500 mPa·s and may be from 10 to 50 mPa·s at 25° C. from the viewpoint of coating suitability. In addition, an aqueous resin composition having the following film properties may be used in consideration of physical properties of the aqueous resin layer to be formed. The coating film obtained by coating a glass plate with the aqueous resin composition so as to have a thickness of 1 mm and drying this for 1 hour at 120° C. has a glass transition temperature Tg of from −58° C. to 7° C., a pencil hardness of from 4B to 2H, and a tensile strength measured in conformity to JISK 7113 of from 15 to 69 MPa.

As the resin, the same one as the resin used in the ground layer described above may be mentioned as an example.

(Antireflection Layer)

The antireflection layer may be provided on the hard coat layer. The antireflection layer, for example, has a configuration in which a low refractive index layer and a high refractive index layer are alternately disposed. The antireflection layer may have from 4 to 10 layers and may have from 5 to 8 layers.

The refractive index of the low refractive index layer may be from 1.35 to 1.80 and may be from 1.45 to 1.50 at a wavelength of from 500 to 550 nm. The low refractive index layer is formed of an inorganic oxide, and may be formed of $SiO_2$.

The refractive index of the high refractive index layer may be from 1.90 to 2.60 andmaybe from 2.00 to 2.40 at a wavelength of from 500 to 550 nm.

The high refractive index layer is, for example, formed of an inorganic oxide. The inorganic oxide used in the high refractive index layer may be at least one kind of inorganic oxide selected from $ZrO_2$, $Ta_2O_5$, $Y_2O_3$, $TiO_2$, $Nb_2O_5$, and $Al_2O_3$ and may be $ZrO_2$ or $Ta_2O_5$.

The spectacle lens may have a hard coat layer and other functional layers only on the surface of the lens substrate or on the rear surface thereof as well. The spectacle lens may be a plastic lens for spectacles in which the lens substrate is a plastic.

In the spectacle lens of the present disclosure, the vibration amplitude of the ripple at the spectral reflectance of the measuring light wavelength may be set from 380 to 780 nm to 2% or less. The interference fringe is suppressed by suppressing the vibration amplitude in such a range. The vibration amplitude of the ripple may be 1.5% or less and may be 1.3% or less in order to suppress the interference fringe. In some embodiments, for example, the vibration amplitude may be 0.5% or more in order to facilitate the manufacture.

The vibration amplitude of the ripple can be adjusted by providing the ground layer, but it is possible to more remarkably decrease the vibration amplitude of the ripple by using a relatively thick hard coat layer having a film thickness of 8 μm or more.

[Manufacturing Method]

The method for manufacturing a spectacle lens of the present invention includes (1) forming a ground layer having an optical film thickness of from 0.2λ to 0.3λ in light having a wavelength λ of from 450 to 650 nm by coating a lens substrate having a refractive index of from 1.58 to 1.74 with a dispersion containing at least metal oxide particles and a resin and (2) forming a hard coat layer having a refractive index of from 1.49 to 1.51 by coating the lens substrate having the ground layer with a mixture containing silica particles and a binder and curing the mixture.

The manufacturing method of the present invention may include (1-1) forming an intermediate layer containing a resin by coating the lens substrate having the ground layer with a dispersion containing at least a resin.

1. Forming the Ground Layer

The ground layer can be formed by coating the surface of the substrate with a dispersion containing at least metal oxide particles and a resin and drying the dispersion. The refractive index of the ground layer to be obtained is easily adjusted by coating with the dispersion prepared in advance.

As the coating method, a known coating method can be used, and it may be a spin coating method or a dipping method. The coating conditions may be appropriately set so as to be able to form the ground layer having a desired film thickness. Before coating, the polarizing film surface of the surface to be coated can also be subjected to a chemical treatment using an acid, an alkali, various kinds of organic solvents, or the like, a physical treatment using plasma, ultraviolet light, ozone, or the like, and a detergent treatment using various kinds of detergents. By conducting such a pretreatment, it is possible to improve the adhesive property.

After coating with the aqueous resin composition, an aqueous resin layer can be formed as a ground layer by drying the composition. The drying can be conducted, for example, by placing the member on which the ground layer is formed in an atmosphere of from room temperature to 100° C. for from 5 minutes to 24 hours.

(1-1) Forming the Intermediate Layer

With regard to the method for forming the intermediate layer, it is possible to form a resin layer as a primer layer by coating the surface of the substrate with a dispersion containing at least a resin and drying the dispersion. As the coating method, the same method as in the ground layer described above may be mentioned as an example.

(2) Forming the Hard Coat Layer

The hard coat layer is formed by coating the lens substrate having the ground layer with a mixture containing silica particles and a binder and curing the mixture.

As the binder, the silane compounds described above may be used.

As the coating means of the mixture, it is possible to apply a method that is usually used such as a dipping method, a spin coating method, a spray method. The curing treatment is usually conducted by heating for a mixture containing a polyfunctional epoxy compound as the component (C). The curing treatment by heating can be conducted, for example, by placing a lens coated with the mixture in an environment having an ambient temperature of from 50 to 150° C. for about 30 minutes to 3 hours. On the other hand, the irradiation light for the curing treatment is, for example, an electron beam or ultraviolet light for the curable composition containing the component (C) having a photocurable group as a curable group. The kind of irradiation light and the irradiation conditions are appropriately selected depending on the kind of component (C). Generally, it is possible to form a hard coat layer which has a high strength and contributes to the improvement of abrasion resistance of the lens by irradiating the mixture with ultraviolet light at an irradiation light dose of about from 500 to 2000 mJ/cm$^2$.

EXAMPLES

Hereinafter, the present disclosure will be described in more detail with reference to Examples, but the present invention is not limited to these Examples. Incidentally, the evaluation of the plastic lenses obtained in Examples and Comparative Examples were carried out as follows.

[Average Film Thickness of Hard Coat Layer]

The average film thickness of the hard coat layer was measured by using a lens substrate on which the hard coat layer was formed and a non-contact type film thickness measuring apparatus (non-contact film thickness measuring instrument FF 8 manufactured by SystemRoad co., Ltd.) by the optical interference method.

[Test for Durability in QUV]

The surface of the spectacle lens was cut by 1 cm with a cutter knife so that the cuts intersect vertically and horizontally, the spectacle lens was (1) irradiated with ultraviolet light of 0.77 W for 4 hours and then (2) put in a high-humidity environment (humidity: 90%) for 4 hours in the QUV ultraviolet fluorescent tube type accelerated weathering tester manufactured by Q-Lab Corporation. The cycle consisting of (1) and (2) was repeated for the regulated time, and the time until cracks were generated on the hard coat layer was evaluated.

(Evaluation Criteria for Crack)
5 no cracks at all
4 cracks in 1 mm or less at tip
3 cracks in 5 mm or less at tip
2 cracks on the entire surface
1 cracks on the entire surface in white
(Evaluation on Adhesive Property)
5 not peeled off at all
4 slightly peeled off
3 peeled off by about half
2 peeled off to partly remain
1 entirely peeled off

[Spectral Reflectance]

The spectral reflectance was measured at a light wavelength of from 380 to 780 nm by using the spectrophotometer U-4100 (manufactured by Hitachi High-Technologies Corporation).

Example 1

The plastic lens substrate (plastic lens for spectacle, trade name: EYNOA manufactured by HOYA CORPORATION, refractive index: 1.67) was washed.

(λ/4 Layer)

To 305.0 g of methanol, 126 g of 4-hydroxy-4-methyl-2-pentanone (DAA) and 350.5 g of water were added, 217.5 g of a thermoplastic resin (SUPERFLEX 170 manufactured by DKS Co., Ltd.), a sol-like material (ZrO$_2$ sol) prepared by dispersing the HZ-407MH of a trade name manufactured by NISSAN CHEMICAL INDUSTRIES, LTD. in methanol at 40% by mass, 1.0 g of a leveling agent (Y-7006 manufactured by Dow Corning Toray) were further added thereto, and the mixture was stirred for 1 hour at 20° C. and treated through a filter, thereby obtaining a liquid for λ/4 layer.

The liquid for λ/4 layer thus obtained was applied on the plastic lens substrate by a spin coating method and dried and solidified for 20 minutes at 100° C., thereby forming a λ/4 layer on both surfaces of the lens substrate.

(Primer Layer)

To 305.0 g of methanol, 126 g of 4-hydroxy-4-methyl-2-pentanone (DAA) and 350.5 g of water were added, 217.5 g of a thermoplastic resin (SUPERFLEX 170 manufactured by DKS Co., Ltd.) and 1.0 g of a leveling agent (Y-7006 manufactured by Dow Corning Toray) were further added thereto, and the mixture was stirred for 24 hours at 20° C., thereby obtaining a primer liquid.

The primer liquid thus obtained was applied on the plastic lens substrate by a dipping method and dried and solidified for 20 minutes at 100° C., thereby forming a primer layer on both surfaces of the lens substrate.

(Hard Coat Layer)

The hard coat liquid prepared as presented in Table 1 was applied on the lens substrate on which the primer layer was formed by a spray method such that the thickness of the cured film to be formed became 30 μm.

Thereafter, the hard coat liquid was pre-cured for 20 minutes at 75° C. and subsequently cured for 2 hours at 110° C., thereby fabricating a spectacle lens having a hard coat layer on both surfaces.

Through the above processes, a spectacle lens respectively having a hard coat layer on both surfaces of the lens substrate via a primer layer.

(AR Layer)

Next, an antireflection layer (AR layer) in which 8 layers of a SiO$_2$ layer and a ZrO$_2$ layer were alternately laminated by a vacuum deposition method was formed on the hard coat layer, thereby obtaining a plastic lens. The plastic lens thus obtained was evaluated, and the results thereof are presented in the following tables.

Examples 2 to 8 and Comparative Examples 1 to 5

The plastic lenses were obtained in the same manner as in Example 1 except that the configurations of the primer layer, the hard coat layer, and the AR layer were as those presented in the following tables. The plastic lenses thus obtained were evaluated, and the results thereof are presented in the following tables.

The reference signs in the tables are as follows.

160: plastic lens for spectacle, trade name: EYAS manufactured by HOYA CORPORATION, refractive index: 1.60

167: plastic lens for spectacle, trade name: EYNOA manufactured by HOYA CORPORATION, refractive index: 1.67

170: plastic lens for spectacle, trade name: EYRY manufactured by HOYA CORPORATION, refractive index: 1.70

174: plastic lens for spectacle, trade name: EYVIA manufactured by HOYA CORPORATION, refractive index: 1.74

TABLE 1

|  |  |  | Kind of hard coat liquid | | | |
|---|---|---|---|---|---|---|
|  |  |  | HC1 | HC2 | HC3 | HC4 |
| Blended amount*1 (parts by mass) | Inorganic oxide particles: component (A) | Kind<br>Blended amount | $SiO_2$<br>52 | $SiO_2$<br>44 | $SiO_2$<br>50 | $TiO_2/ZrO_2$<br>43/14 |
|  | Silane coupling agent: component (B) | Kind<br>Blended amount | KBM403<br>24 | KBM403<br>39 | KBM403<br>50 | KBM403<br>43 |
|  | Epoxy compound: component (C) | Kind<br>Blended amount | EX-321<br>24 | EX-321<br>17 | —<br>— | —<br>— |

*1 based on solid
$SiO_2$: silica sol (trade name: PGM-ST manufactured by NISSAN CHEMICAL INDUSTRIES, LTD.)
KBM403: γ-glycidoxypropyltrimethoxysilane (trade name: KBM403 manufactured by Shin-Etsu Chemical Co., Ltd.)
EX-321: trimethylolpropane oil glycidyl ether (di- to tri-functional, trade name: EX-321 manufactured by Nagase ChemteX Corporation)

TABLE 2

|  |  | Example 1 | Example 2 | Example 3 | Example 4 | Example 5 | Example 6 | Example 7 | Example 8 |
|---|---|---|---|---|---|---|---|---|---|
| Substrate | Kind | 160 | 160 | 160 | 160 | 160 | 167 | 170 | 174 |
|  | Refractive index | 1.60 | 1.60 | 1.60 | 1.60 | 1.60 | 1.67 | 1.70 | 1.74 |
| λ/4 layer | Presence or absence | Presence | Presence | Presence | Presence | Presence | Presence | Presence | Presence |
|  | Optical film thickness | 0.25λ | 0.25λ | 0.25λ | 0.25λ | 0.25λ | 0.25λ | 0.25λ | 0.25λ |
|  | Refractive index | 1.55 | 1.55 | 1.55 | 1.55 | 1.55 | 1.59 | 1.60 | 1.62 |
| Primer layer | Presence or absence | Presence | Presence | Presence | Presence | Absence | Absence | Absence | Absence |
|  | Refractive index | 1.50 | 1.50 | 1.50 | 1.50 | — | — | — | — |
| Hard coat layer | Kind of hard coat liquid | HC1 | HC1 | HC1 | HC1 | HC2 | HC2 | HC2 | HC2 |
|  | Kind of sol | $SiO_2$ | $SiO_2$ | $SiO_2$ | $SiO_2$ | $SiO_2$ | $SiO_2$ | $SiO_2$ | $SiO_2$ |
|  | Film thickness [μm] | 30 | 20 | 10 | 3 | 3 | 3 | 3 | 3 |
|  | Refractive index | 1.50 | 1.50 | 1.50 | 1.50 | 1.50 | 1.50 | 1.50 | 1.50 |
| AR layer |  | Presence | Presence | Presence | Presence | Presence | Presence | Presence | Presence |
| Test for durability against QUV | Cracks | 4 | 4 | 5 | 5 | 5 | 5 | 5 | 4 |
|  | Adhesion | 4 | 4 | 4 | 5 | 5 | 5 | 5 | 5 |

λ = 550 nm

TABLE 3

|  |  | Comparative Example 1 | Comparative Example 2 | Comparative Example 3 | Comparative Example 4 | Comparative Example 5 |
|---|---|---|---|---|---|---|
| Substrate | Kind | 160 | 160 | 160 | 160 | 167 |
|  | Refractive index | 1.60 | 1.60 | 1.60 | 1.60 | 1.67 |
| λ/4 layer | Presence or absence | Absence | Absence | Presence | Presence | Presence |
|  | Optical film thickness | — | — | 0.25λ | 0.25λ | 0.25λ |
|  | Refractive index | — | — | 1.55 | 1.55 | 1.59 |
| Primer layer | Presence or absence | Absence | Presence | Presence | Presence | Presence |
|  | Refractive index | — | 1.50 | 1.50 | 1.50 | 1.50 |

TABLE 3-continued

| | | Comparative Example 1 | Comparative Example 2 | Comparative Example 3 | Comparative Example 4 | Comparative Example 5 |
|---|---|---|---|---|---|---|
| Hardcoat layer | Kind of hard coat liquid | HC3 | HC3 | HC3 | HC3 | HC4 |
| | Kind of sol | $SnO_2$ | $SnO_2$ | $SnO_2$ | $SnO_2$ | $TiO_2 + ZrO_2$ |
| | Film thickness [μm] | 3 | 20 | 3 | 20 | 3 |
| | Refractive index | 1.60 | 1.60 | 1.60 | 1.60 | 1.70 |
| | AR layer | Presence | Presence | Presence | Presence | Presence |
| Test for durability against QUV | Cracks | 5 | 2 | — | — | 2 |
| | Adhesion | 2 | 2 | — | — | 2 |

λ = 550 nm

Examples 9 and 10

In Example 9, a plastic lens was obtained by the same method as in Example 3 except that the substrate was a plastic lens for spectacle having a refractive index of 1.74 (trade name: EYVIA manufactured by HOYA CORPORATION, refractive index: 1.74).

In Example 10, a plastic lens was obtained by the same method as in Example 8 except that the substrate was a plastic lens for spectacle having a refractive index of 1.74 (trade name: EYVIA manufactured by HOYA CORPORATION, refractive index: 1.74).

Figure 2:
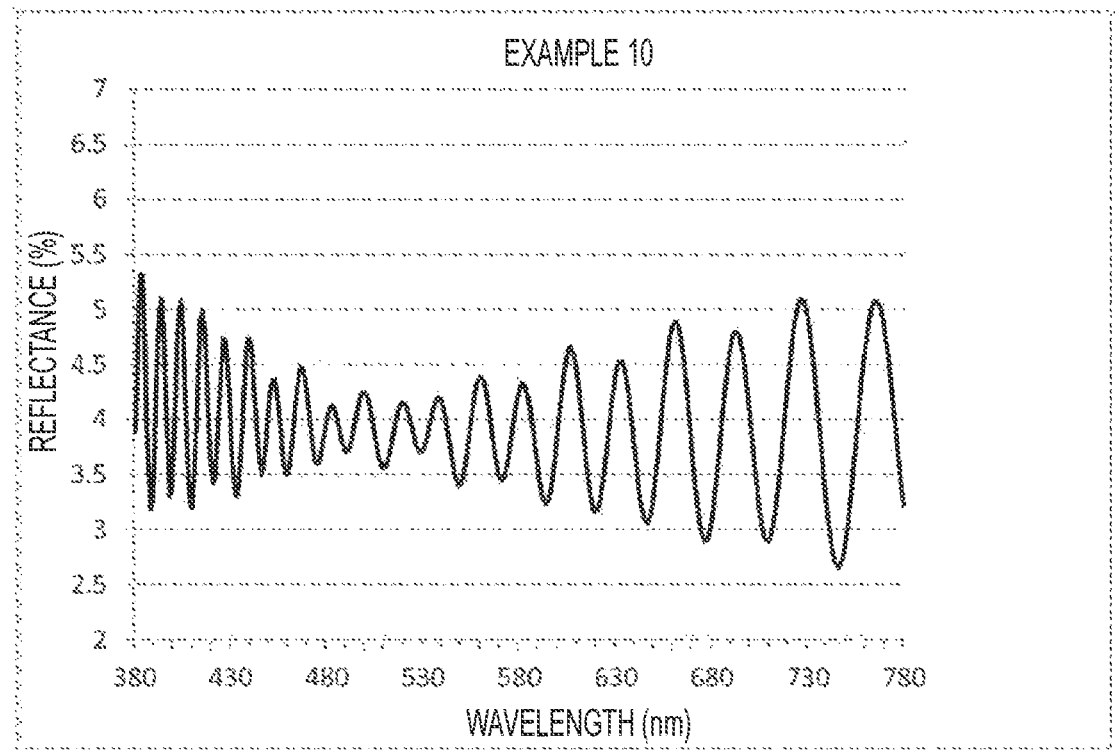
FIG. 2 illustrates the measurement results on the spectral reflectance of the lens of Example 10.

The spectral reflectance of the plastic lenses thus obtained was measured, and the results thereof are illustrated in FIGS. 1 and 2. As the measurement results of the spectral reflectance, the vibration amplitude on the ripple was 1.13% in Example 9 and it was 2.67% in Example 10. From the above results, it has been revealed that it is possible to decrease the vibration amplitude of the ripple by increasing the film thickness of the hard coat layer.

The invention claimed is:

1. A spectacle lens comprising:
   a lens substrate formed of a polyurethane-based material or a polysulfide material and having a refractive index of from 1.58 to 1.74;
   a hard coat layer that is obtained by curing a mixture containing silica particles and a silane compound and has a refractive index of from 1.49 to 1.51; and
   a ground layer that is provided between the lens substrate and the hard coat layer, contains a resin having metal oxide particles dispersed, and has an optical film thickness of from 0.2 λ to 0.3 λ in light having a wavelength λ of from 450 to 650 nm,
   wherein a film thickness of the hard coat layer is 8 μm or more and 100 μm or less, and
   wherein the resin of the ground layer contains an aqueous polyurethane resin composition, and
   wherein a refractive index β of the ground layer satisfies the following relational expression (1) with a refractive index α of the lens substrate and a refractive index γ of the hard coat layer:

$$0.4 \leq (\alpha-\beta)/(\alpha-\gamma) \leq 0.6 \qquad (1).$$

2. The spectacle lens according to claim 1, wherein a content of an inorganic oxide containing an element belonging to from the group 3 to the group 13 in the periodic table in the hard coat layer is 0.1% by mass or less.

3. The spectacle lens according to claim 1, further comprising an intermediate layer containing a resin and provided between the ground layer and the hard coat layer.

4. The spectacle lens according to claim 3, wherein the refractive index α of the lens substrate is greater than 1.68.

5. The spectacle lens according to claim 4, wherein a vibration amplitude of a ripple at a spectral reflectance of a measuring light wavelength of from 380 to 780 nm is set to 2% or less.

6. The spectacle lens according to claim 1, wherein the lens substrate is formed of a polysulfide material.

7. The spectacle lens according to claim 1, wherein the refractive index of the lens substrate is greater than 1.68.

8. The spectacle lens according to claim 1, wherein a vibration amplitude of a ripple at a spectral reflectance of a measuring light wavelength of from 380 to 780 nm is set to 2% or less.

9. The spectacle lens according to claim 2, further comprising an intermediate layer containing a resin and provided between the ground layer and the hard coat layer.

10. The spectacle lens according to claim 2, wherein the refractive index of the lens substrate is greater than 1.68.

11. The spectacle lens according to claim 2, wherein a vibration amplitude of a ripple at a spectral reflectance of a measuring light wavelength of from 380 to 780 nm is set to 2% or less.

12. The spectacle lens according to claim 1, wherein the ground layer is provided directly on a surface of the lens substrate closest to the hard coat layer.

13. A method for manufacturing a spectacle lens, the method comprising:
   forming a ground layer having an optical film thickness of from 0.2 λ to 0.3 λ in light having a wavelength λ of from 450 to 650 nm by coating a lens substrate formed of a polyurethane-based material or a polysulfide material and having a refractive index of from 1.58 to 1.74 with a dispersion containing at least metal oxide particles and a resin; and
   forming a hard coat layer having a refractive index of from 1.49 to 1.51 by coating the lens substrate having the ground layer with a mixture containing silica particles and a binder and curing the mixture,
   wherein a film thickness of the hard coat layer is 8 μm or more and 100 μm or less, and
   wherein the resin of the ground layer contains an aqueous polyurethane resin composition, and
   wherein a refractive index β of the ground layer satisfies the following relational expression (1) with a refractive index α of the lens substrate and a refractive index γ of the hard coat layer:

$$0.4 \leq (\alpha-\beta)/(\alpha-\gamma) \leq 0.6 \qquad (1).$$

14. The method for manufacturing a spectacle lens according to claim 13, wherein the dispersion is applied by a spin coating method or a dipping method in the forming of the ground layer.

15. The method for manufacturing a spectacle lens according to claim 13, wherein the lens substrate is formed of a polysulfide material.

16. The method for manufacturing a spectacle lens according to claim 13, wherein the refractive index of the lens substrate is greater than 1.68.

17. A spectacle lens comprising:
- a lens substrate formed of a polyurethane-based material or a polysulfide material and having a refractive index of from 1.58 to 1.74;
- a hard coat layer that is obtained by curing a mixture containing silica particles and a silane compound and has a refractive index of from 1.49 to 1.51, the hard coat layer having a film thickness of 10 μm or more and 50 μm or less; and
- a ground layer that is provided between the lens substrate and the hard coat layer, contains a resin having metal oxide particles dispersed, and has an optical film thickness of from 0.22 λ to 0.3 λ in light having a wavelength λ of from 450 to 650 nm,
- wherein the resin of the ground layer contains an aqueous polyurethane resin composition, and
- wherein a refractive index β of the ground layer satisfies the following relational expression (1) with a refractive index α of the lens substrate and a refractive index γ of the hard coat layer:

$$0.4 \leq (\alpha-\beta)/(\alpha-\gamma) \leq 0.6 \tag{1}.$$

18. The spectacle lens according to claim 17, further comprising an intermediate layer containing a resin and provided between the ground layer and the hard coat layer.

19. The spectacle lens according to claim 17, wherein a vibration amplitude of a ripple at a spectral reflectance of a measuring light wavelength of from 380 to 780 nm is set to 2% or less.

* * * * *